US012781469B2

(12) United States Patent
Gorman et al.

(10) Patent No.: US 12,781,469 B2
(45) Date of Patent: Nov. 3, 2026

(54) HAULING MACHINE LOADING USING MACHINE PERCEPTION

(71) Applicant: Caterpillar Inc., Peoria, IL (US)

(72) Inventors: Corey Lee Gorman, Peoria, IL (US); Roberto Martinez, Chicago, IL (US); Justin Lee Steinlage, Mackinaw, IL (US); Russell Schloss, Pittsburgh, PA (US)

(73) Assignee: Caterpillar Inc., Peoria, IL (US)

( * ) Notice: Subject to any disclaimer, the term of this patent is extended or adjusted under 35 U.S.C. 154(b) by 97 days.

(21) Appl. No.: 18/648,786

(22) Filed: Apr. 29, 2024

(65) Prior Publication Data

US 2025/0333931 A1 Oct. 30, 2025

(51) Int. Cl.

| | |
|---|---|
| ***E02F 9/00*** | (2006.01) |
| ***E02F 9/20*** | (2006.01) |
| ***E02F 9/26*** | (2006.01) |
| ***G06T 7/70*** | (2017.01) |

(52) U.S. Cl.

CPC ............ *E02F 9/2045* (2013.01); *E02F 9/264* (2013.01); *G06T 7/70* (2017.01); *G06T 2207/30204* (2013.01)

(58) Field of Classification Search

CPC .......... E02F 9/2045; E02F 9/264; G06T 7/70; G06T 2207/30204

USPC ............................................................ 701/50

See application file for complete search history.

(56) References Cited

U.S. PATENT DOCUMENTS

| | | | | |
|---|---|---|---|---|
| 2014/0146167 | A1 | 5/2014 | Friend et al. | |
| 2021/0047804 | A1 | 2/2021 | Canepari | |
| 2021/0158564 | A1 * | 5/2021 | Chakravarty | G06T 7/73 |
| 2021/0301494 | A1 * | 9/2021 | Berry | E02F 9/205 |
| 2022/0364331 | A1 | 11/2022 | Ouellette et al. | |
| 2023/0060815 | A1 * | 3/2023 | Massey | G05D 1/2247 |

FOREIGN PATENT DOCUMENTS

| | | | |
|---|---|---|---|
| CN | 102852188 | A | 1/2013 |
| CN | 205242489 | U | 5/2016 |
| CN | 114040363 | B | 3/2023 |
| DE | 29907366 | U1 | 8/1999 |
| EP | 4033035 | A1 | 7/2022 |

(Continued)

OTHER PUBLICATIONS

Volvo, "Volvo Updates and Expands Load Assist Across Wheel Loader Line; Announces Machine Updates," Sep. 8, 2020, Volvo Construction Equipment North America, whole document. (Year: 2020).*

(Continued)

*Primary Examiner* — Tiffany P Young

(57) ABSTRACT

A loading system is constructed to load a hauling machine by a loading machine. The system includes a fiducial marker affixed to the hauling machine. A set of sensors of diverse sensory modalities is deployed on the loading machine that generate respective signals indicative of the fiducial marker in the corresponding sensor modalities. A processor on the loading machine determines a machine orientation in space of the hauling machine through machine perception applied to the signals. Loading the hauling machine by the loading machine is guided according to the machine orientation.

20 Claims, 5 Drawing Sheets

(56) References Cited

FOREIGN PATENT DOCUMENTS

| | | |
|---|---|---|
| EP | 4198210 A1 | 6/2023 |

OTHER PUBLICATIONS

Edwin Olson, "AprilTag: A robust and flexible visual fiducial system", 2011 IEEE International Conference on Robotics and Automation, May 9-13, 2011, 8 pages.

Written Opinion and International Search Report for Int'l. Patent Appln. No. PCT/US2025/022693, mailed Jul. 11, 2025 (13 pgs).

* cited by examiner

HAULING MACHINE LOADING USING MACHINE PERCEPTION

The present disclosure generally relates to machine perception techniques. More specifically, the disclosure is directed to machine perception as applied to loading hauling machines.

BACKGROUND

Hauling loads, e.g., dirt, rocks, construction debris, waste matter, etc., is a common and often critical task in construction, mining, waste management, etc. Such hauling tasks may involve a loading machine, such as an excavator, to transfer the material from a workspace, such as the ground, a material heap or a mine face, to the bed of a hauling machine. Loading a hauling machine can be challenging due to several factors that affect the accuracy, efficiency, and overall success of the process. Maximizing the load on a particular hauling machine is key to minimizing operational costs. Loading a hauling machine is prone to human error, particularly when the hauling machine is not level with the ground or is otherwise angularly misaligned with the loading machine. Additionally, difficult terrain, poor visibility, or unfavorable weather conditions can make loading more complicated in that machine operators may need line-of-sight visual contact with one another.

Techniques for assisting work machine operators in performing such construction tasks include Chinese Patent Document CN 114040363, which is directed to a vehicle-to-vehicle data interaction technique between a data transmitter located on a first vehicle that receives an identity label and a data receiver located on a second vehicle, wherein the identity label is generated and sent after the radio frequency identifier located on the first vehicle reads the radio frequency label located on the second vehicle. The data transmitter on the first vehicle establishes wireless communication connection with the data receiver according to the identity label. The vehicle-to-vehicle data interaction is based on radio frequency identification (RFID) technology, the radio frequency identifier and the radio frequency tag with the data receiver identity label are installed on the two vehicles respectively. The two vehicles establish a wireless communication connection based on the identity label, and transmission of audio, video and other data can be subsequently achieved.

Research and engineering resources continue to be expended towards assisting work machines in performing construction operations that include loading a hauling machine.

SUMMARY

In one aspect of the present inventive concept, a loading system is constructed to load a hauling machine by a loading machine. The system includes a fiducial marker affixed to the hauling machine. A set of sensors of diverse sensory modalities is deployed on the loading machine that generate respective signals indicative of the fiducial marker in the corresponding sensor modalities. A processor on the loading machine determines a machine orientation in space of the hauling machine through machine perception applied to the signals. Loading the hauling machine by the loading machine is guided according to the machine orientation.

In yet another aspect of the present inventive concept, a loading apparatus constructed to load a hauling machine by a loading machine includes a set of sensors of diverse sensory modalities on the loading machine. The set of sensors generate respective signals indicative of a fiducial marker in the corresponding sensor modalities. A processor on the loading machine constructed to determine a machine orientation in space of the hauling machine through machine perception applied to the signals and to guide the loading machine in loading the hauling machine according to the machine orientation.

In another aspect of the present inventive concept, a machine loading method includes identifying a fiducial marker via machine perception and determining, from the identified fiducial markers, a pose of a hauling machine relative to that of a loading machine. The method updates a work assist loading process with the pose of the hauling machine and activating work assist processing for guide-assisted or automated machine loading. The hauling machine is loaded by the loading machine under control of the work assist processing.

DESCRIPTION OF EXAMPLE EMBODIMENTS

Figure 1:
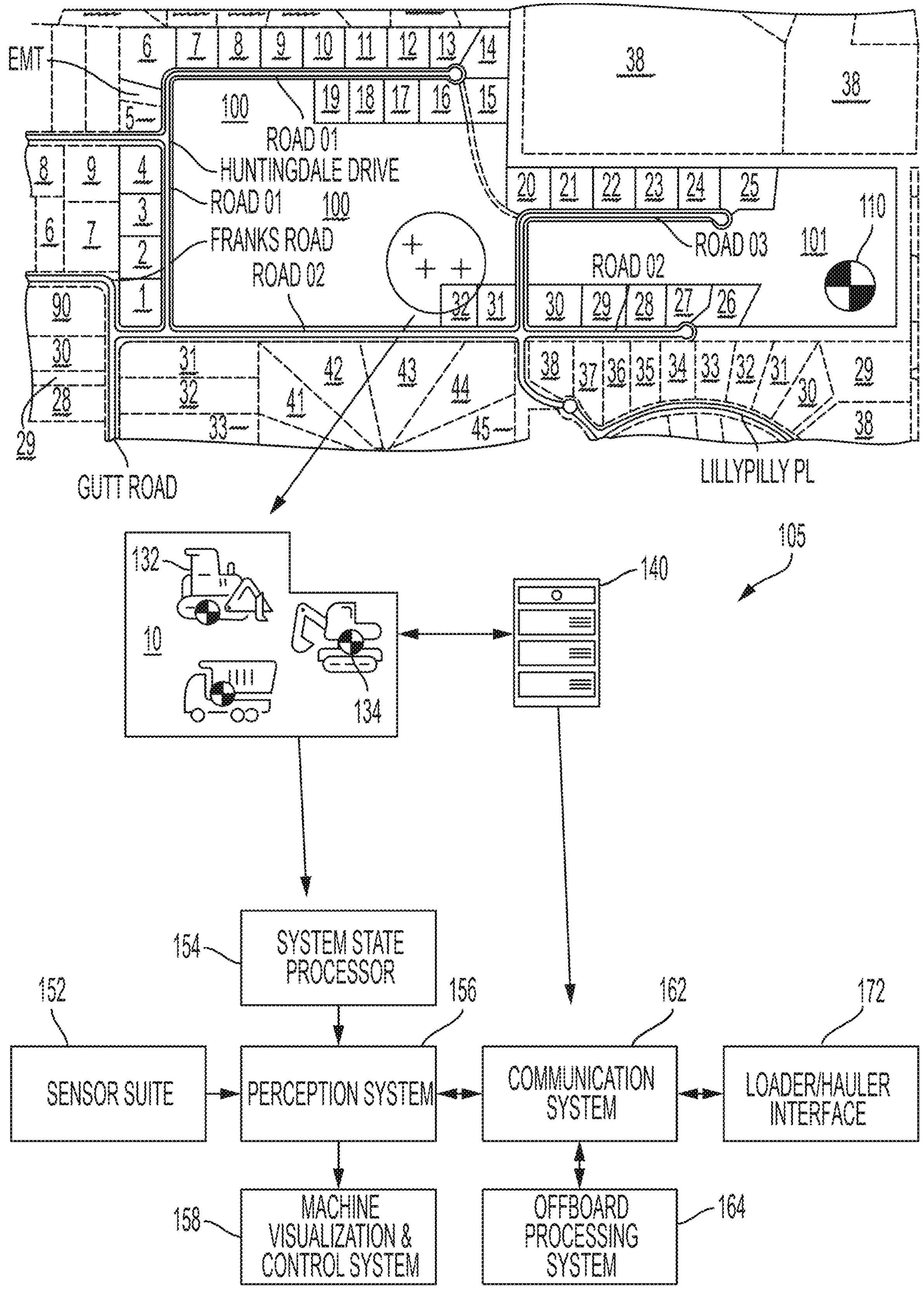
FIG. 1 is a diagram depicting an exemplary work machine loading system by which the present inventive concept can be embodied.

The present inventive concept is best described through certain embodiments thereof, which are described in detail herein with reference to the accompanying drawings, wherein like reference numerals refer to like features throughout. It is to be understood that the term invention, when used herein, is intended to connote the inventive concept underlying the embodiments described below and not merely the embodiments themselves. It is to be understood further that the general inventive concept is not limited to the illustrative embodiments described below and the following descriptions should be read in such light.

Additionally, the word exemplary is used herein to mean, "serving as an example, instance or illustration." Any embodiment of construction, process, design, technique, etc., designated herein as exemplary is not necessarily to be construed as preferred or advantageous over other such embodiments.

The figures described herein include schematic block diagrams illustrating various interoperating functional modules. Such diagrams are not intended to serve as electrical schematics and interconnections illustrated are intended to depict signal flow, various interoperations between functional components and/or processes and are not necessarily direct electrical connections between such components. Moreover, the functionality illustrated and described via separate components need not be distributed as shown, and the discrete blocks in the diagrams are not necessarily intended to depict discrete electrical components.

The techniques described herein are directed to machine perception in construction, e.g., hauling machine loading procedures. Upon review of this disclosure and appreciation of the concepts disclosed herein, the ordinarily skilled artisan will recognize other machine perception contexts in which the present inventive concept can be applied. The scope of the present invention is intended to encompass all such alternative implementations.

The integration of diverse sensor technologies into a cohesive system, analyzed through advanced algorithms, provides a comprehensive loading technique that surpasses the capabilities of any single sensor type. Sensor fusion further leverages the strengths and mitigates the weaknesses of individual sensors, offering several advantages: 1) combining visual, thermal, and distance data ensures a well-rounded perception of the operational environment, enabling accurate decision-making under various conditions; 2) the redundancy offered by multiple sensor types enhances system reliability, allowing for cross-verification of data and reducing the likelihood of false positives or missed detections; 3) the ability to adapt to different environmental conditions and operational requirements significantly improves, ensuring consistent performance regardless of visibility, weather, or terrain challenges; and 4) machine learning algorithms can integrate and analyze data from all sensors, offering predictive insights that improve safety and operational efficiency, such as anticipating maintenance needs or identifying potential hazards before they become critical.

The present inventive concept provides a marking and recognition technique for a loading operation at a work site. The system can include any number or combination of perception sensors. These can include cameras/smart cameras, radar, FLIR, or lidar solutions in combination with a truck with identification or fiducial markings. Further, the inventive concept may be utilized with other embedded functionality to adjust payload targets within setting of the excavator machine and to calculate position of the excavator machine or the truck that is to be loaded. The marking and recognition technology may assist operators in avoiding the truck and evenly loading material. Moreover, the system may communicate a target position to a truck to be loaded via a radio communication such as Wi-Fi, Bluetooth, cellular or satellite. The markings on the truck may require coating of materials with various emissivity to be more easily identified.

FIG. 1 is a diagram depicting an exemplary work machine loading system 105 by which the present inventive concept can be embodied. The boundaries and internal structures of a worksite 10 may be realized according to a site plan 100 by work machines, such as dozer 132, hauling machine 136 and excavator 138. Work machines 132, 136 and 138 may have fiducial markers, representatively illustrated at fiducial marker 134, attached thereto. Another fiducial marker, e.g., fiducial marker 110, may provide a global (in absolute coordinates) or local reference (in coordinates relative to the fiducial marker). Metadata may be associated with the fiducial markers 134 that inform the work machines 132, 136 and 138 of site design information relative to the fiducial marker's location. Some implementations of the present inventive concept may encode information on the fiducial marker itself. For example, embodiments of the present inventive concept may utilize AprilTags, developed by the University of Michigan and available in an open-source software package. AprilTags encode a lexicographical code, or lexicode thereon, that can be decoded by perception system 156 to derive among other things, machine orientation within the relevant coordinate system (local vs. global) as well. Careful attachment of an AprilTag can indicate the orientation of the item to which it is applied, e.g., the pose of work machines 132, 136 and 138. It is to be understood that other marking systems may be used to embody the present inventive concept so long as distance and orientation can be derived or otherwise acquired therefrom.

Sensor suite 152 may include sensors of diverse modalities for use by perception system 156 for machine perception. System state processor 154 may be constructed to evaluate sensor suite 152 as to what sensors are present in the suite and/or which are in operable order. Additionally, system state processor 152 may determine what features a machine operator has enabled to the extent that the perception processing is concerned. When so embodied, a state vector of the present and enabled sensors as configured by operator features may be provided to perception system.

Perception system 156 may be constructed or otherwise configured to receive sensor data from sensor suite 152, e.g., data from fiducial markers 134 taken through varied sensor modalities, combine sensor data across modalities, decode lexicodes and format resulting perception data for use by machine visualization and control system 158. As stated above, the sensor data from each sensor may be presented to perception system 156 as a state vector and perception system 156 may implement a Kalman filter or a neural network. Perception data output by perception system 156, may include a marker type, e.g., a work machine index, an index number that may identify a specific point in the site plan design, a location of the marker in either local or global reference frames, and a pose or orientation of fiducial markers 134.

Machine visualization and control system 158 may be constructed or otherwise configured to provide the machine operator with a view of the work tool as it traverses a tool path during the loading operations. Machine visualization and control system 158 may further control precision of the construction operation by automated mechanisms that are provided with the perception data described above.

Perception system 156 may rely on offboard data and processing by way of a worksite server 140 that implements an offboard processing system 164 through a communication system 162. Worksite server 140 may be located on worksite 10 or may be located remotely from worksite 10. Additionally, a loader/hauler interface 172 may be implemented through communication system 162 whereby a loading machine, e.g., excavator 138, may provide pose and other data to a hauling machine, e.g., haul truck 136.

Figure 2:
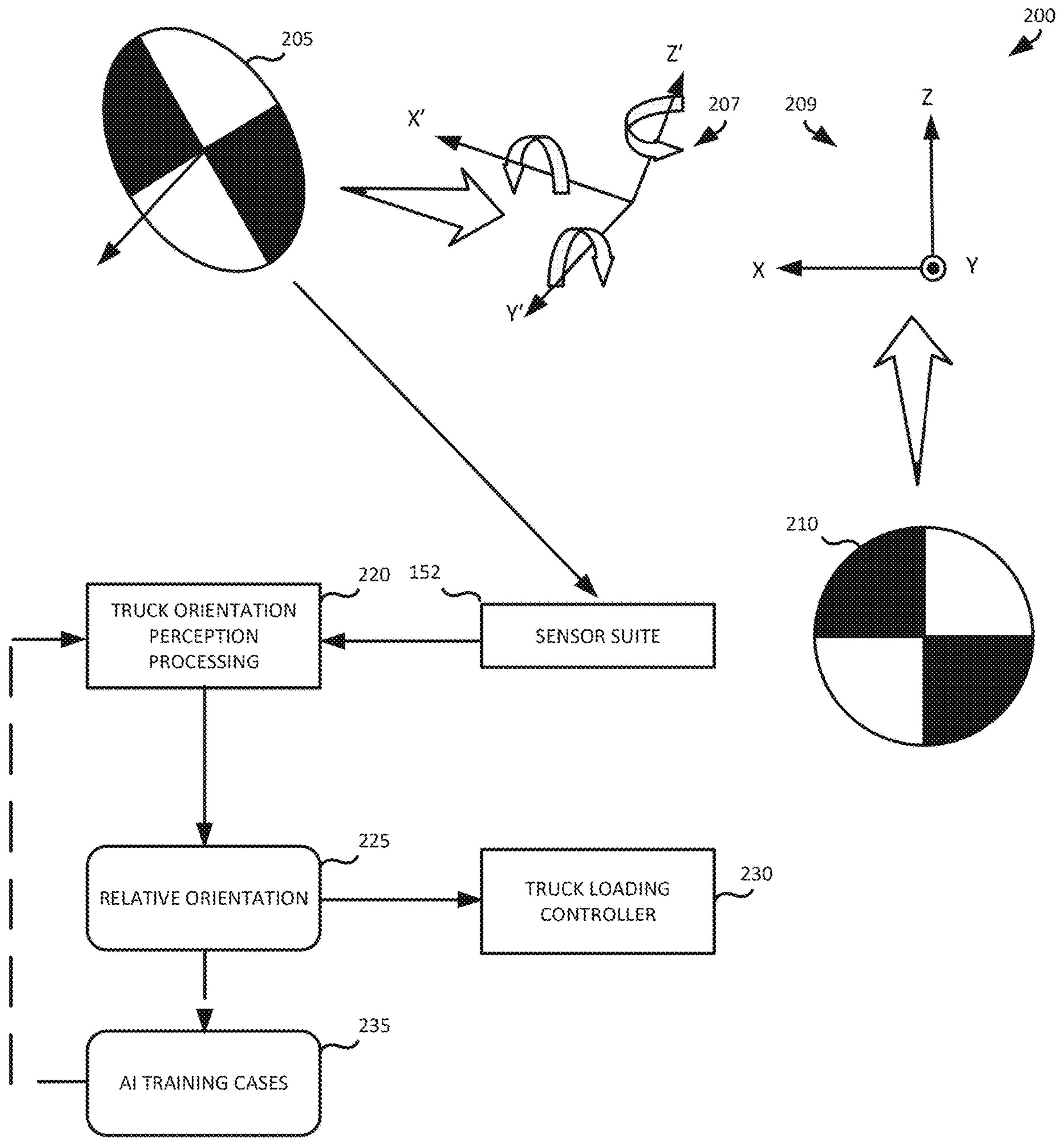
FIG. 2 is an illustration of exemplary machine orientation determination processing by which the present inventive concept can be embodied.

FIG. 2 is an illustration of exemplary machine orientation determination processing 200 by which the present inventive concept can be embodied. It is to be assumed that, solely for purposes of explanation, a loading machine 138 and a hauling machine 136 each have fiduciary markers 210 and 205, respectively. It is to be assumed as well that loading machine 138 is spatially located on a worksite, for example, in an orientation 209 as indicated by fiducial marker 210. Hauling machine 136 may be located in an orientation 207 as indicated by fiducial marker 205. The difference between orientation 207 and 209 may be defined in values for forward/backwards (e.g., along the x-axis), up/down (e.g., along the z-axis), left/right (e.g., along the y-axis), pitch (e.g., axially about the y-axis), roll (e.g., axially about the x-axis) and yaw (e.g., axially about the z-axis) for six (6) degrees of freedom.

Sensor suite 152 may probe or otherwise obtain features established on fiducial marker 205 through diverse modalities, e.g., visible, infrared and radio electromagnetic energy.

The diverse sensor modalities may be fused by truck orientation perception processing component 220 such that incomplete knowledge obtained by one sensor may be supplemented by that of other sensors, and vice-versa, to form a computer-readable data set representing the probed fiducial marker 205. Fiducial marker 205 may have formed thereon a pattern, which may be applied with emissive material that is excitable from one or more probing sensor modalities.

Once imaged by sensor suite 152, truck orientation perception processing component 220 may determine the relative orientation 225 between excavator 138 and hauling machine 136. The pattern on fiducial markers may be such as to afford determination of its orientation in space through image processing. Artificial intelligence may be deployed in the orientation determination as well. When so embodied, the present inventive concept may collect training cases 235 of relevant relative orientations. Training cases 235 may be verified and/or annotated by human subject matter experts and the artificial intelligence onboard loading machine 138 may be trained on the annotated AI training cases 235.

A most recently computed relative orientation 235 may be provided to a truck loading controller 230 that is constructed or otherwise configured to deliver guiding indicia to a display in loading machine 138. Truck loading controller 230 may further constrain the tool path of loading machine 138 for precision in the earth moving process and to, for example, prevent the earth moving tool (e.g., an excavator bucket) from striking hauling machine 136.

Figure 3:
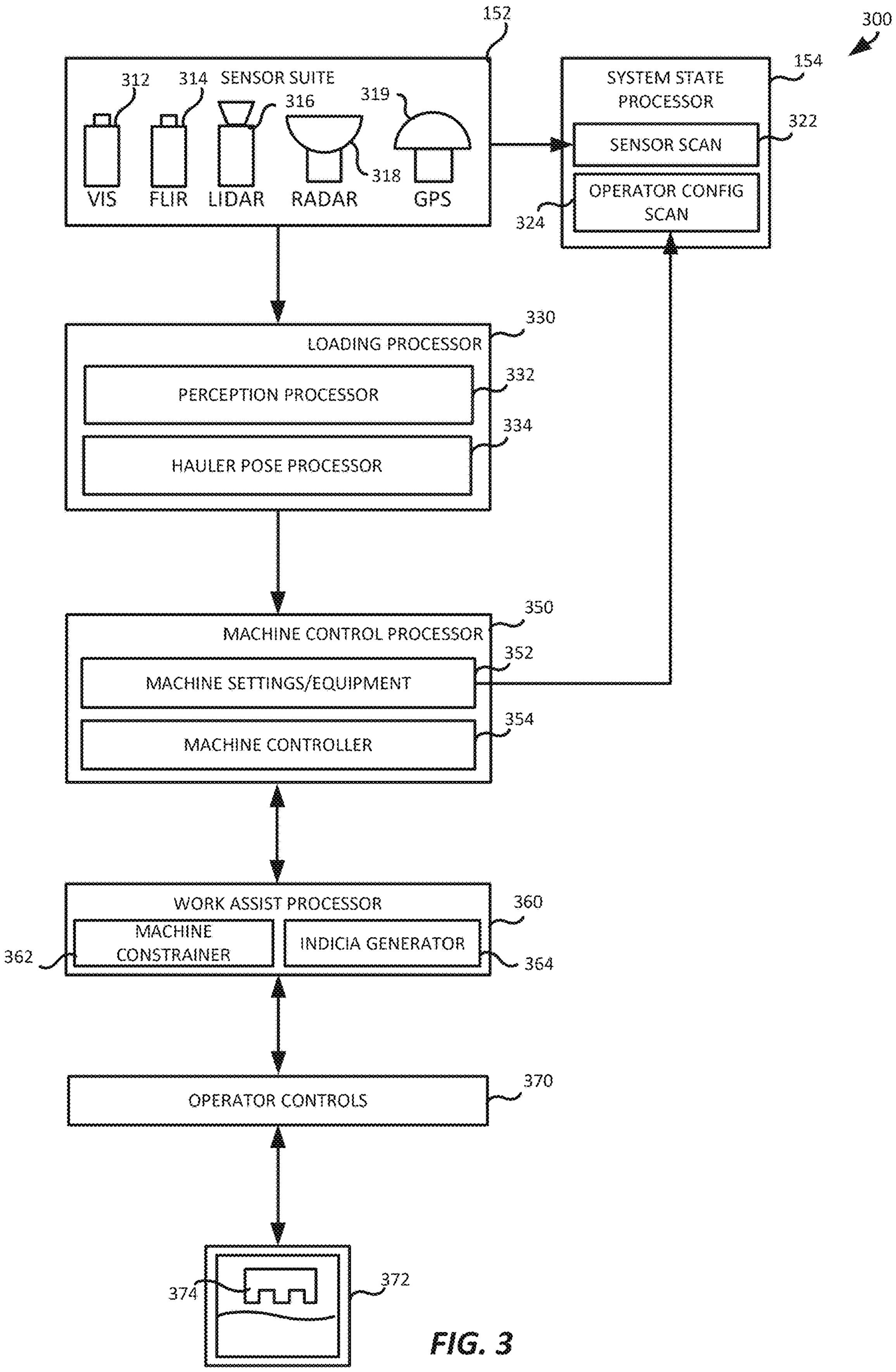
FIG. 3 is a schematic block diagram of an exemplary hauler loading apparatus by which the present inventive concept can be embodied.

FIG. 3 is a schematic block diagram of an exemplary hauler loading apparatus 300 by which the present inventive concept can be embodied. As described above, sensor suite 152 may implement sensors of varied modalities, such as a visible spectrum camera 312, a forward-looking infrared (FLIR) camera 314, a lidar 316, a radar 318 and a GPS receiver 319. Visible spectrum camera 312 may be a smart camera that performs feature detection and tagging. FLIR camera 314 may capture images from the infrared spectrum and may provide data obtained from fiducial markers that have high emissivity in the infrared spectrum. Lidar 316 may generate 3-dimensional point cloud data from which objects of interest may be recognized. Radar 318 may produce distance data and may be configured with Doppler mechanisms from which speed and direction of travel can be ascertained. GPS receiver 319 may provide absolute geolocation data.

Loading apparatus 300 may include loading processor 330 that is constructed from processor circuitry to perform computation and data processing operations for deriving a pose from a fiducial marker 134 on a hauling machine 136. Perception processor 332 may be constructed to implement machine perception by which an excavator 138 may, for example, identify fiducial markers, determine their orientations, and retrieve therefrom information encoded thereon. Multiple sensor modalities of sensor suite 152 may beneficially retrieve the information on multiple detection channels, e.g., visible, infrared, radio, etc., which increases the probability of correctly obtaining the position and orientation of, and lexicode from the fiducial markers. In some implementations, the sensor signals may be provided to perception processor 332 as a state vector for processing by statistical techniques, e.g., a Kalman or particle filter, by artificial intelligence, e.g., a deep learning neural network, etc. Hauler pose processor 334 may be constructed to determine and ascertain a pose of hauling machine 136, including its distance from loading machine 138. As stated above, the pattern established on fiducial marker 134 may be such to determine distance and pose when suitably decoded and analyzed, such as by image processing.

System state processor 154 may include a sensor scan component 322 by which sensor suite 152 is analyzed for proper operation and for presence of the various sensors implemented therein. System state processor 154 may further include an operator configuration scan component 324 by which machine settings/equipment 352 of loading machine 138 that are set in accordance with the undergoing earth moving operation are indicated.

Machine control processor 350 may further include machine controller 354 by which control over work machine earth moving operations may be carried out. The present inventive concept may be embodied with different machine control techniques. Machine controller 354 may guide the construction operations under direction of a work assist processor 360 that assists the operator in more precise loading operations, such as loading the bed of hauling machine 136 evenly even when canted relative to loading machine 138. Work assist processor 360 may further include a machine constrainer 362 that interoperates with operator controls 370 to constrain the path of work tool 374 to that required for the undergoing earth moving operation. An indicia generator 364 may be constructed to indicate machine operations on a display 372.

Figure 4:
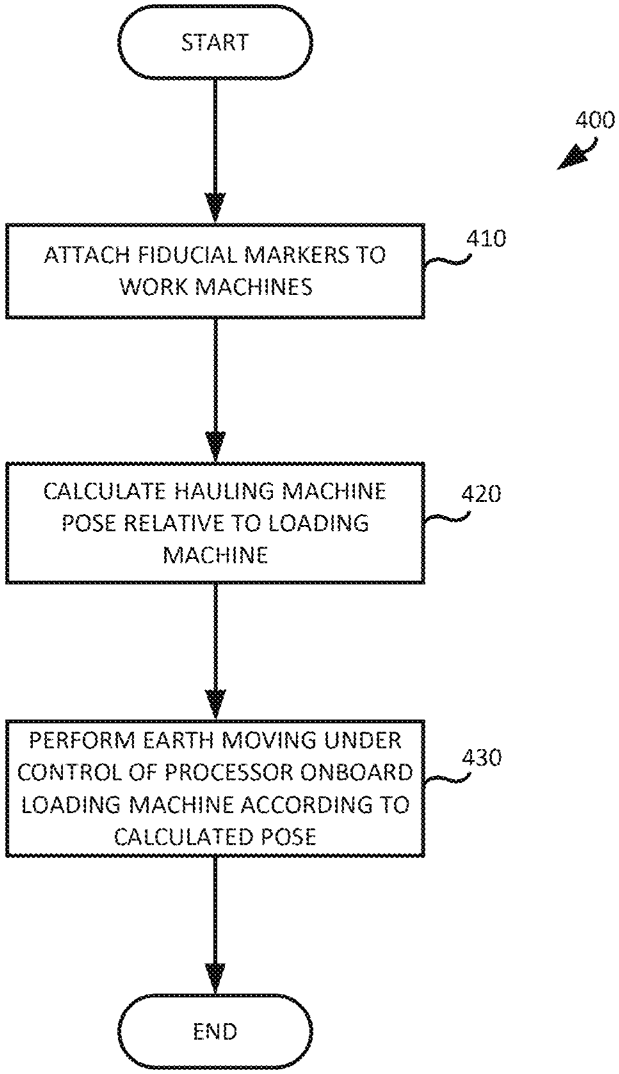
FIG. 4 is a flowchart of an exemplary pose determination process by which the present inventive concept can be embodied.

FIG. 4 is a flowchart of an exemplary pose determination process 400 by which the present inventive concept can be embodied. In operation 410, fiducial markers are attached to work machines, where the fiducial markers may have a pattern distributed over its surface from which a machine pose can be ascertained. Process 400 may then transition to operation 420, by which the pose of the hauling machine relative to the loading machine is calculated. In operation 430, an earth moving operation may be performed under control of a processor onboard the loading machine, such as by the control techniques described above, based on the hauling machine pose.

Figure 5:
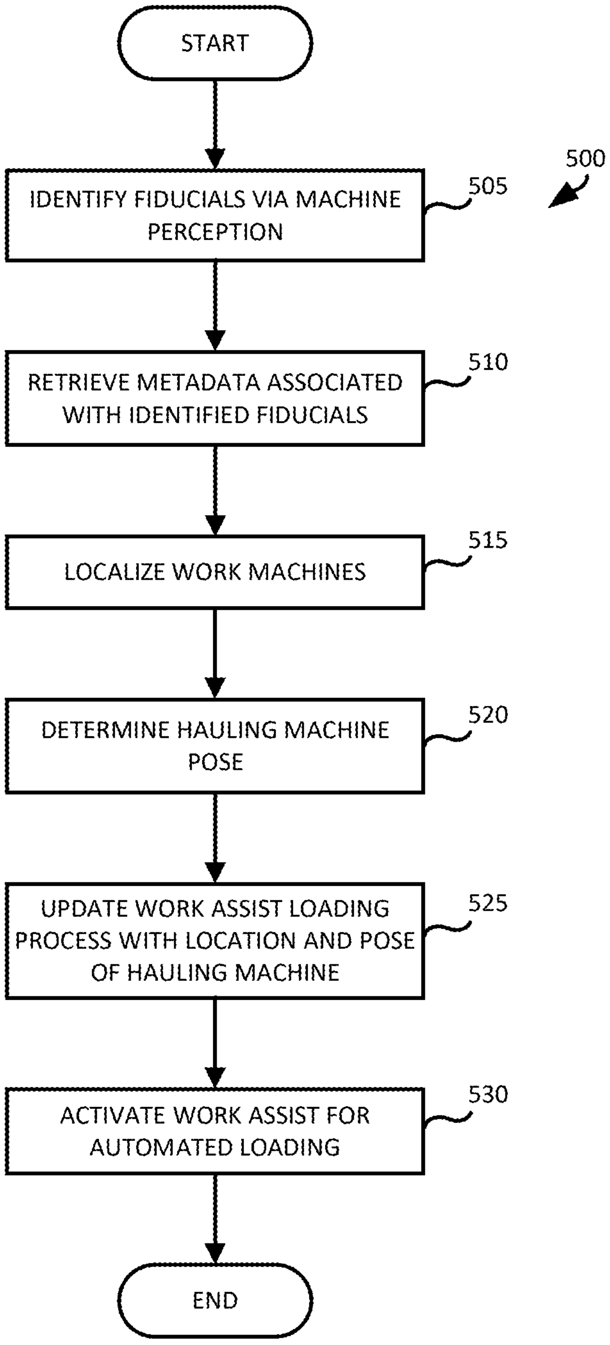
FIG. 5 is a flowchart of an exemplary loading process by which the present inventive concept can be embodied.

FIG. 5 is a flowchart of an exemplary loading process 500 by which the present inventive concept can be embodied. At operation 505, process 500 identifies fiducial markers via machine perception and, in operation 510, metadata associated with the identified fiducial markers are retrieved. When AprilTags are used, for example, the metadata may be encoded on the fiducial markers themselves. Other implementations are possible, including those that retrieve the metadata from an offboard repository or database. In operation 515, the work machines may be localized and in operation 520, the hauling machine pose may be determined. Process 500 may transition to operation 525, a work assist loading process may be updated with the location and pose of the hauling machine. Process 500 may transition to operation 530 by which work assist processing may be activated for guide-assisted or automated machine loading.

Certain embodiments of the present general inventive concept provide for the functional components to manufactured, transported, marketed and/or sold as processor instructions encoded on computer-readable media. The present general inventive concept, when so embodied, can be practiced regardless of the processing platform on which the processor instructions are executed and regardless of the manner by which the processor instructions are encoded on the computer-readable medium.

It is to be understood that the computer-readable medium described above may be any non-transitory medium on which the instructions may be encoded and then subsequently retrieved, decoded and executed by a processor, including electrical, magnetic and optical storage devices.

Examples of non-transitory computer-readable recording media include, but not limited to, read-only memory (ROM), random-access memory (RAM), and other electrical storage; CD-ROM, DVD, and other optical storage; and magnetic tape, floppy disks, hard disks and other magnetic storage. The processor instructions may be derived from algorithmic constructions in various programming languages that realize the present general inventive concept as exemplified by the embodiments described above.

INDUSTRIAL APPLICABILITY

In such fields as construction and mining, maximizing hauling machine loads is a key component to profitability. While this task is relatively easy on level ground, it becomes more challenging when there is a difference in orientation between the hauling machine and the loading machine. Performing construction operations of a worksite may rely heavily on a staked-out site design. Further complicating hauling machine loading is the environmental conditions at the loading site. Machine perception applied to machine loading overcomes difficulties in establishing visibility of fiducial markers on the hauling by multichannel or multimodal sensing. Additionally, such perception processing may also determine the orientation of the hauling machine. These features allow optimal loading for the given hauling machine in the given environmental conditions. Thus, the construction and mining industries seek techniques that afford such optimal loading of materials. The present inventive concept provides mechanisms by which loading machine and or loading machine operations may be controlled for more precise construction and mining operations.

Embodiments of the disclosed subject matter can also be as set forth according to the following parentheticals.

(1). A loading system constructed to load a hauling machine by a loading machine, the system comprising: a fiducial marker affixed to the hauling machine, a set of sensors of diverse sensory modalities on the loading machine, the set of sensors generating respective signals indicative of the fiducial marker in the corresponding sensor modalities, and a processor on the loading machine constructed to: determine a machine orientation in space of the hauling machine through machine perception applied to the signals, and guide the loading machine in loading the hauling machine according to the machine orientation.

(2). The system of (1), wherein the processor is further constructed to determine the machine orientation solely from the orientation of the fiducial markers.

(3). The system of (1), wherein the processor is further constructed to guide the loading machine by displaying guiding indicia on a display on the loading machine.

(4). The system of (1), wherein the processor is further constructed to guide the loading machine by constraining the loading machine to a tool path defined by the machine orientation.

(5). The system of (1) or (4), wherein the processor is further constructed to define the tool path by artificial intelligence.

(6). The system of (1), (4) or (5), wherein the processor is further constructed to train the artificial intelligence on different machine relative orientations between the hauling machine and the loading machine.

(7). The system of (1) further comprising a communication component on each of the hauling machine and the loading machine whereby the loading machine communicates the machine orientation to the hauling machine.

(8). A loading apparatus constructed to load a hauling machine by a loading machine, the apparatus comprising: a set of sensors of diverse sensory modalities on the loading machine, the set of sensors generating respective signals indicative of a fiducial marker in the corresponding sensor modalities, and a processor on the loading machine constructed to: determine a machine orientation in space of the hauling machine through machine perception applied to the signals, and guide the loading machine in loading the hauling machine according to the machine orientation.

(9). The apparatus of (8), wherein the processor is further constructed to determine the machine orientation solely from the orientation of the fiducial markers.

(10). The apparatus of (8), wherein the processor is further constructed to guide the loading machine by displaying guiding indicia on a display on the loading machine.

(11). The apparatus of (8), wherein the processor is further constructed to guide the loading machine by constraining the loading machine to a tool path defined by the machine orientation.

(12). The system of (8) or (11), wherein the processor is further constructed to define the tool path by artificial intelligence.

(13). The apparatus of (8), (11) or (12), wherein the processor is further constructed to train the artificial intelligence on different machine relative orientations between the hauling machine and the loading machine.

(14). The apparatus of (8), further comprising a communication component on the loading machine to communicate the machine orientation to the hauling machine.

(15). A machine loading method comprising: identifying a fiducial marker via machine perception, determining, from the identified fiducial markers, a pose of a hauling machine relative to that of a loading machine, updating a work assist loading process with the pose of the hauling machine, activating work assist processing for guide-assisted or automated machine loading, and loading the hauling machine by the loading machine under control of the work assist processing.

(16). The machine loading method of (15) further comprising constraining a work tool on the loading machine to a path computed by the work assist processing.

(17). The machine loading method of (15) further comprising indicating a work tool path on a display on the loading machine.

(18). The machine loading method of (15) further comprising determining the pose of the hauling machine solely from image processing of the fiducial marker.

(19). The machine loading method of (15) further comprising retrieving metadata from the fiducial marker that identifies the hauling machine.

(20). The machine loading method of (15) further comprising communicating the pose of the hauling machine from the loading machine to the hauling machine.

The descriptions above are intended to illustrate possible implementations of the present inventive concept and are not restrictive. Many variations, modifications and alternatives will become apparent to the skilled artisan upon review of this disclosure. For example, components equivalent to those shown and described may be substituted therefore, elements and methods individually described may be combined, and elements described as discrete may be distributed across many components. The scope of the invention should therefore be determined not with reference to the description above, but with reference to the appended claims, along with their full range of equivalents.

What is claimed is:

1. A loading system constructed to load a hauling machine by a loading machine, the system comprising:

a fiducial marker affixed to the hauling machine, the fiducial marker having encoded thereon information from which worksite associated metadata that includes worksite design information is retrieved;

a set of sensors of diverse sensory modalities on the loading machine, the set of sensors generating respective signals based on impinging energy on the fiducial marker corresponding to the respective sensor modalities; and a processor on the loading machine constructed to:

combine sensor data generated from the signals across the diverse sensor modalities, whereby the sensor data obtained from one of the sensor modalities is supplemented by the sensor data obtained from another one of the sensor modalities to form a representation of the information from which the worksite associated metadata that includes the worksite design information is indicated;

determine a machine orientation in space including pitch, yaw, and roll of the hauling machine from the information carried in the signals generated by the sensors;

retrieve the worksite associated metadata from the information carried in the signals; and guide the loading machine in loading the hauling machine according to the machine orientation determined from the information carried in the signals generated by the sensors and the worksite associated metadata that includes the worksite design information.

2. The system of claim 1, wherein the processor is further constructed to determine the machine orientation solely from the information derived from the signals generated by the sensors, and the set of sensors include only infrared and/or thermal sensors.

3. The system of claim 1, wherein the processor is further constructed to guide the loading machine by constraining the loading machine to a tool path defined by the machine orientation determined from the information carried in the signals generated by the sensors and the worksite associated metadata that includes the worksite design information.

4. The system of claim 3, wherein the processor is further constructed to define the tool path by artificial intelligence.

5. The system of claim 4, wherein the processor is further constructed to train the artificial intelligence on different machine relative orientations between the hauling machine and the loading machine.

6. The system of claim 1 further comprising a communication component on each of the hauling machine and the loading machine whereby the loading machine communicates the determined machine orientation to the hauling machine.

7. A loading apparatus constructed to load a hauling machine by a loading machine, the apparatus comprising:

a set of sensors of diverse sensory modalities on the loading machine, the set of sensors generating respective signals indicative of information encoded on a fiducial marker based on which worksite associated metadata that includes worksite design information is retrievable and obtained based on impinging energy on the fiducial marker corresponding to the respective sensory modalities; and a processor on the loading machine constructed to:

determine a machine orientation in space of the hauling machine from the information derived from the signals from the sensors;

retrieve the worksite associated metadata that includes worksite design information from the information derived from the signals from the sensors; and guide the loading machine in loading the hauling machine according to the determined machine orientation and the worksite design information.

8. The apparatus of claim 7, wherein the processor is further constructed to determine the machine orientation solely from the information derived from the signals.

9. The apparatus of claim 7, wherein the processor is further constructed to guide the loading machine by constraining the loading machine to a tool path defined by the determined machine orientation and the worksite design information.

10. The apparatus of claim 9, wherein the processor is further constructed to define the tool path by artificial intelligence.

11. The apparatus of claim 10, wherein the processor is further constructed to train the artificial intelligence on different machine relative orientations between the hauling machine and the loading machine.

12. The apparatus of claim 7, further comprising a communication component on the loading machine to communicate the machine orientation to the hauling machine.

13. The loading system of claim 1, wherein the worksite associated metadata includes the worksite design information of the worksite relative to a location of the fiducial marker.

14. The loading system of claim 1, wherein the worksite associated metadata includes identification of the hauling machine at the worksite.

15. The loading system of claim 1, wherein the processor is further constructed to evaluate the set of sensors to determine which of the sensor modalities are active to generate the signals.

16. A machine loading method comprising:

extracting information encoded on a fiducial marker via data formed based on energy impinging on the fiducial marker corresponding to respective sensor modalities of a plurality of sensors;

determining, from the information obtained from the data, a pose of a hauling machine relative to that of a loading machine;

retrieving worksite associated metadata from the information obtained from the data, the worksite associated metadata including a representation of a worksite plan and an identifier of the hauling machine;

updating a work assist loading process with the determined pose of the hauling machine and with the worksite associated metadata;

activating work assist processing for guide-assisted or automated machine loading; and loading the hauling machine by the loading machine under control of the work assist processing and based on the representation of the worksite plan obtained using the worksite associated metadata.

17. The machine loading method of claim 16 further comprising constraining a work tool on the loading machine to a path computed by the work assist processing and the representation of the worksite plan.

18. The machine loading method of claim 16 further comprising indicating a work tool path on a display on the loading machine.

19. The machine loading method of claim 16 further comprising determining the pose of the hauling machine solely from the information obtained from the data.

20. The machine loading method of claim 16 further comprising communicating the determined pose of the hauling machine from the loading machine to the hauling machine.

* * * * *